Sept. 24, 1957 G. A. LYON 2,807,226
APPARATUS FOR SHAPING WHEEL COVERS
Filed April 6, 1950 5 Sheets-Sheet 1
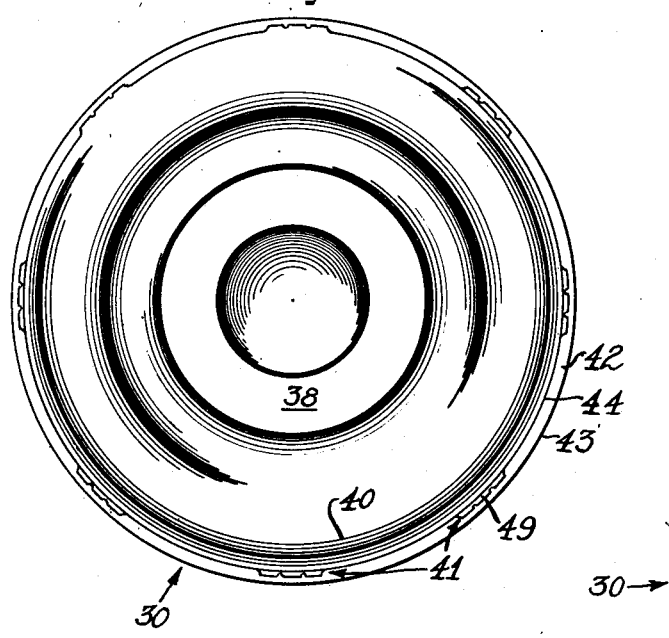
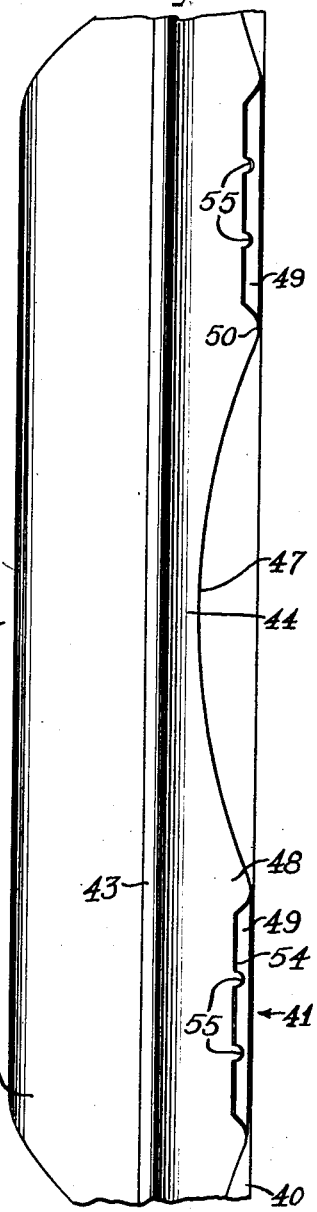
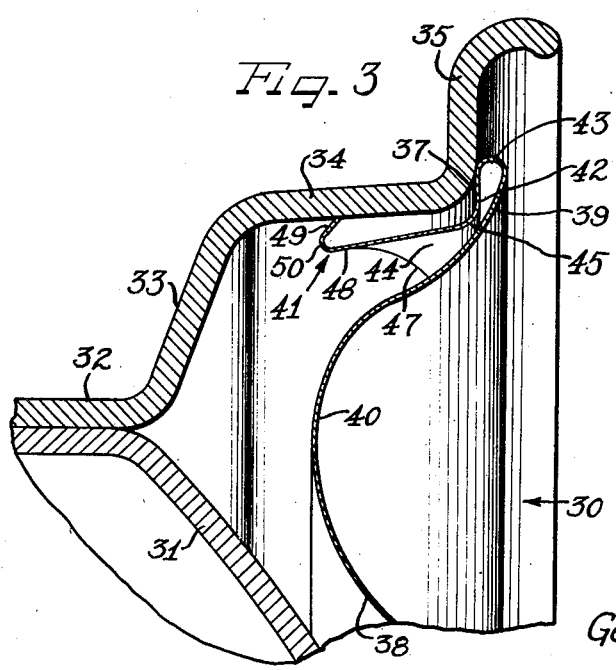
Inventor
George Albert Lyon
by Attys

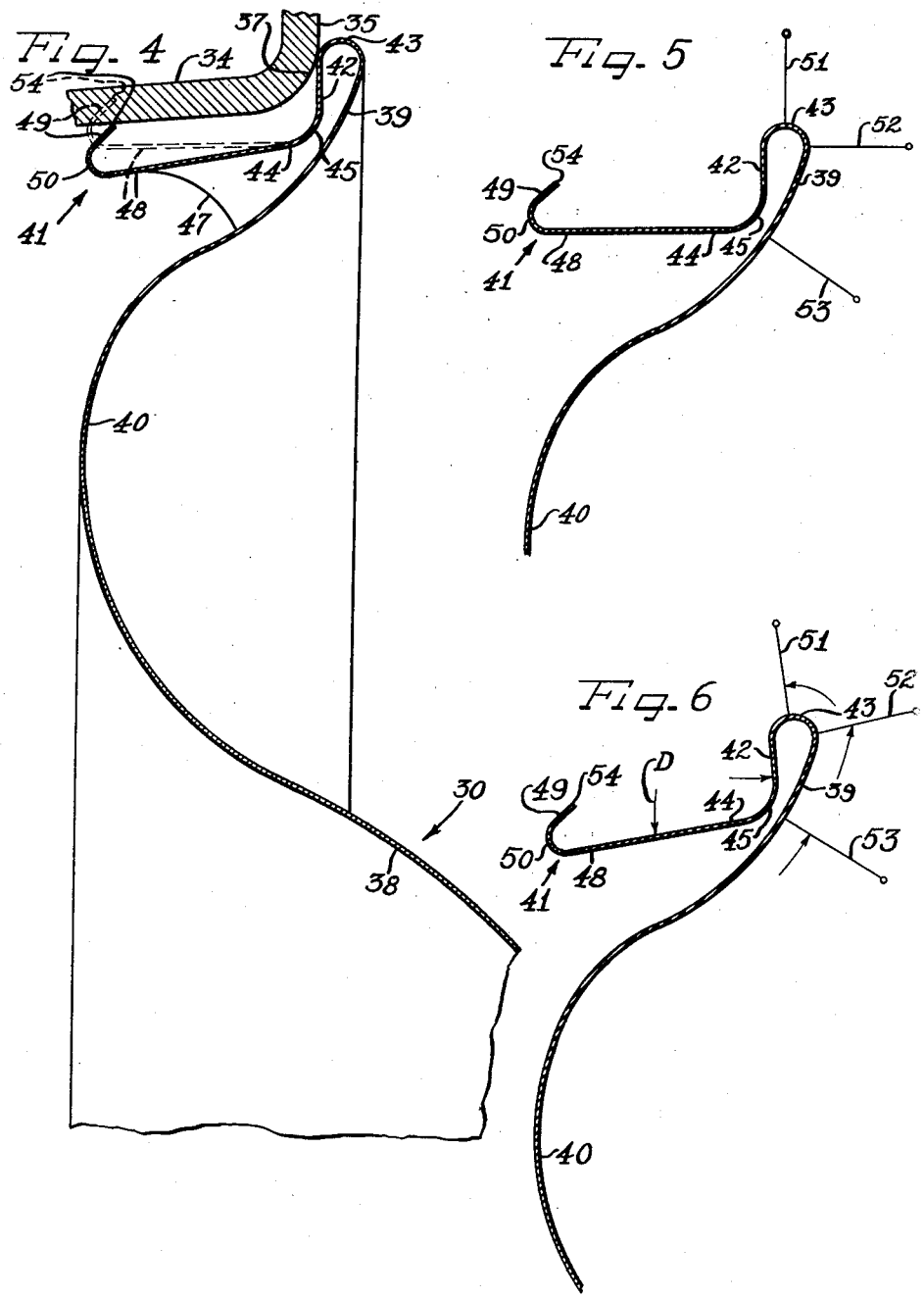

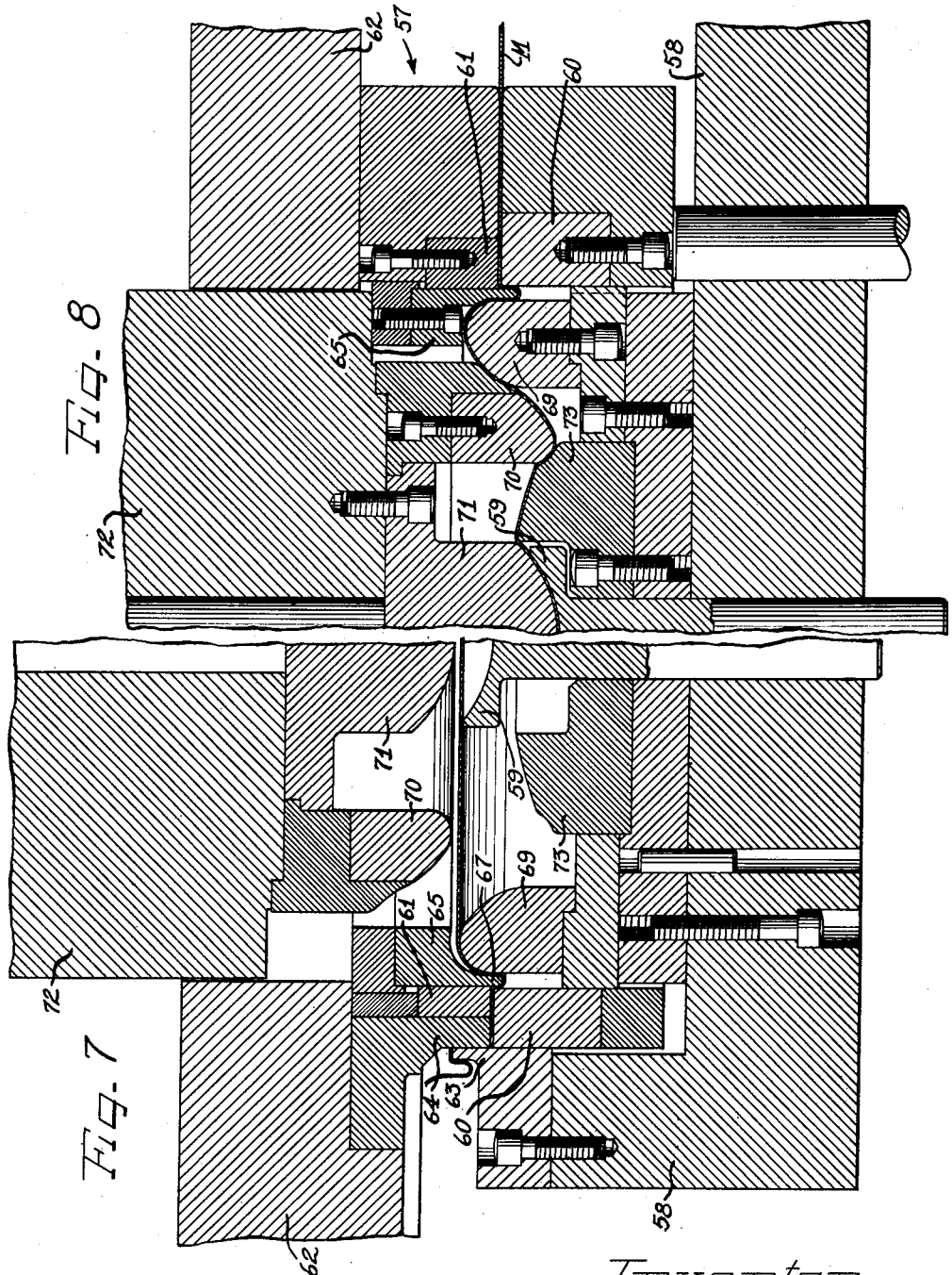

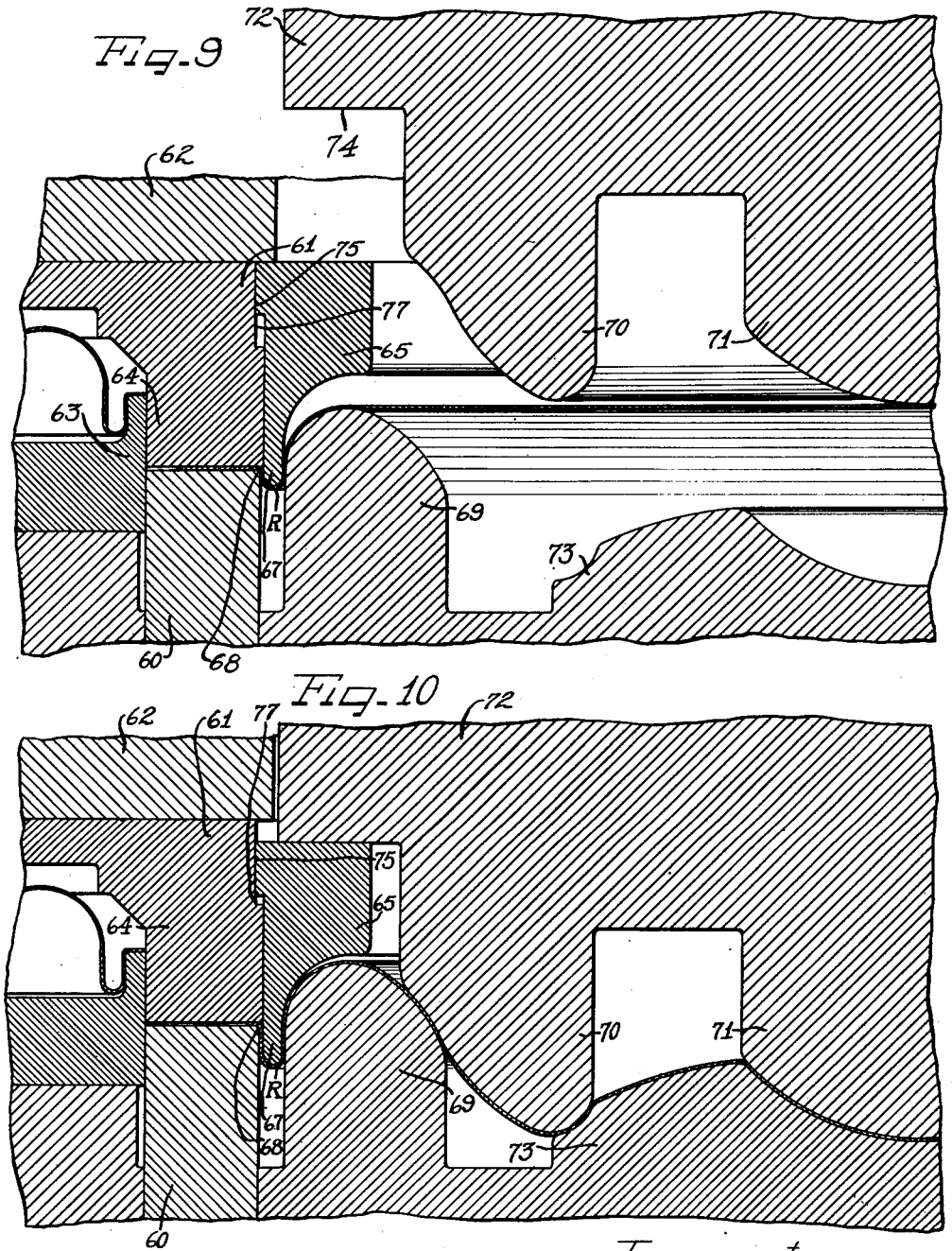

Sept. 24, 1957 G. A. LYON 2,807,226
APPARATUS FOR SHAPING WHEEL COVERS
Filed April 6, 1950 5 Sheets-Sheet 5

Inventor
George Albert Lyon
by The firm of Charles W. Hills Attys

United States Patent Office 2,807,226
Patented Sept. 24, 1957

2,807,226

APPARATUS FOR SHAPING WHEEL COVERS

George Albert Lyon, Detroit, Mich.

Application April 6, 1950, Serial No. 154,221

6 Claims. (Cl. 113—42)

The present invention relates to improvements in wheel covers such as are adapted to be applied to the outer sides of vehicle wheels, and more particularly concerns the provision of such covers having improved means for self-retention upon the wheels to which applied and novel means for making the covers with the self-retention means.

An important object of the present invention is to provide an improved apparatus for making ornamental and protective covers for the outer sides of wheel structures and which covers can be easily and conveniently applied by reasonable manual pressure but which can in each instance be conveniently pried free from the wheel without damage either to the wheel or to the cover so that the cover is indefinitely reusable and the wheel from which the cover may be removed will be free from damage but will remain in proper condition to receive another similar cover with full efficiency.

Another object of the invention is to provide apparatus for shaping wheel covers to afford an especially advantageous cover-retaining relationship between the tire rim of a vehicle wheel and a wheel cover.

A further object of the invention is to provide an improved apparatus for shaping sheet metal blanks to provide ornamental wheel covers.

An additional object of the invention is to provide in apparatus for making a wheel cover or cap, die structure including means for drawing a circular body shape in a sheet metal blank and starting a return bent marginal flange having a radially outwardly extending terminal portion.

Other objects, features and advantages of the present invention will be readily apparent from the following detailed description of a preferred embodiment taken in conjunction with the accompanying drawings in which:

Figure 1 is a rear elevational view of a wheel cover or cap embodying the features of the present invention;

Figure 2 is an enlarged fragmentary side elevational view of the cover of Figure 1;

Figure 3 is a fragmentary radial sectional view through a vehicle wheel showing the cover of Figures 1 and 2 applied to the outer side of the wheel;

Figure 4 is a fragmentary radial sectional view similar to Figure 3 but on a larger scale and showing in greater detail certain structural relationships inherent in the cover of the present invention;

Figure 5 is a fragmentary radial sectional view through a marginal portion of the cover showing the same in the untensioned condition of the retaining fingers;

Figure 6 is a fragmentary sectional view similar to Figure 5 but showing the marginal structural relationships when the retaining fingers are placed under tension radially inwardly as occurs when the cover is applied to the wheel;

Figure 7 is a fragmentary vertical sectional view through a drawing die apparatus showing the same in a preliminary drawing position;

Figure 8 is a fragmentary sectional view through the drawing die apparatus showing the same on completion of the first draw to which a sheet metal blank is subjected in forming the cover of Figure 1;

Figure 9 is an enlarged fragmentary sectional view of the apparatus of Figure 7 more or less schematically shown;

Figure 10 is a sectional view of the drawing die apparatus substantially like Figure 8 but on a larger scale and more or less schematically illustrated;

Figure 12:
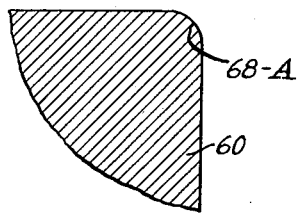
Figure 12 is a greatly enlarged fragmentary vertical sectional view taken substantially on the line XII—XII of Figure 11.

A wheel cover 30 (Figure 1), made with apparatus according to the present invention, is constructed and arranged to be applied to the outer side of a wheel, such as an automobile wheel, including a wheel body 31 and a tire rim 32 (Fig. 3). Both the wheel body and the tire rim may be formed from appropriate gauge sheet metal stamped or rolled to shape and the tire rim is of the multi-flange, drop center type adapted to support a pneumatic tire and tube assembly (not shown). To this end, the tire rim 32 includes a side flange 33 which extends generally radially outwardly, an intermediate generally axially outwardly and slightly radially outwardly tapered or generally frusto-conical intermediate flange 34, and a generally radially outwardly and axially outwardly extending terminal flange 35 which merges on a rounded shoulder 37 with the intermediate flange 34.

A significant feature of the cover 30 resides in the construction whereby the cover is self-retaining upon the wheel so that the wheel need not be equipped with any special structure or expedient for retaining the cover on the wheel. Thus, the wheel need have no special cover-retaining clips, nor any holes formed therein to receive clips or parts of the cover, and no special grooves or protrusions or any other element or structure need be supplied on the wheel for retaining the cover, since the cover holds itself on the wheel. Furthermore, the cover 30 is so equipped with novel retaining means that it can be simply and easily applied to the wheel by simply pressing it into wheel covering, retained relation on the wheel. Removal of the cover from the wheel can be effected easily and expeditiously in the manner which has been customary for removal of automobile wheel hub caps, namely, by inserting a pry-off tool between the margin of the cover and the adjacent portion of the wheel and prying the cover from the wheel. In other words, means are provided for retaining the cover on the wheel in snap-on, pry-off relation.

Where desired, of course, the cover 30 could take the form of a trim which will substantially cover the outer side of the tire rim and an adjacent portion of the wheel body, while a central hub cap covers the central, bolt-on flange portion of the wheel, but in view of the modern trend toward ever smaller wheels and larger tires, a full disk cover or cap is highly desirable since a single cover member thereby suffices on each wheel rather than having two cover members. The latter desirable end is attained with unusual effectiveness and success in actual practice not only for new vehicles but also by way of replacement accessory for existing vehicles. Automobile manufacturers are adopting the cover of the present invention in ever increasing numbers because of its many inherent advantages.

From both a structural and economic viewpoint, the objectives of the present invention are attained by a fairly simple construction wherein the cover 30 is made entirely from a single piece of sheet metal, comprising a body portion 38 having a generally radially outwardly extending marginal portion 39 of a diameter to overlie the juncture shoulder 37 of the tire rim. In a preferred form the cover body radially inwardly from the marginal portion 39 is of dished, concave cross section providing a large radius generally axially inwardly extending rib 40 arranged to project into the relatively wide annular axially outwardly opening groove defined between the tire rim and the outwardly bulging wheel body 31. The central portion of the cover may be provided with any desired design configurations. The marginal portion 39 may be of convexly contoured cross sectional merging smoothly with the concave intermediate portion 40 of the cover.

Of the utmost importance are the structural features, characteristics and the functional relationships of the self-retaining means of the cover 30. To this end the outside diameter of the intermediate convex cover portion 40 is substantially less than the inside diameter of the tire rim intermediate flange 34 so as to provide a substantial radial space therebetween providing an ample clearance for novel retaining finger structure comprising an annular series of generally axially inwardly extending retaining fingers 41 formed integrally in one piece with the cover margin 39. For this purpose, the cover margin 39 comprises an underturned generally radially inwardly extending flange portion 42 having juncture with the outer exposed marginal portion 39 on a small radius bead-like radially outwardly projecting reinforcing rib juncture 43 which in assembly with the wheel lies at its axially inner side against the tire rim juncture shoulder 37 or the immediately adjacent portion of the terminal flange 35.

The underturned flange 42 is of a radial extent to project radially inwardly beyond and clear of the tire rim shoulder 37 and merges with an axially inwardly extending flange portion 44 from which the retaining fingers 41 extend integrally in one piece therewith. As best seen in Figures 3 and 4, the marginal finger-carrying flange portion 44 joins the underturned flange portion 42 on a juncture shoulder 45 which is spaced from the opposing inner face of the cover body. Further, the retaining finger flange 44 is accommodated in the space or clearance between the tire rim intermediate flange 34 and the adjacent inwardly projecting intermediate cover portion 40. It will be observed that the inwardly extending flange portion 44 of the retaining flange structure is formed on a circle concentric with the cover and with the tire rim intermediate flange 34 but is of substantially smaller diameter than the inner face of the tire rim intermediate flange and of greater diameter than the contiguous cover portion 40.

Each of the retaining fingers 41 extends axially inwardly in the plane of the flange 44 and comprises an integral extension in one piece with the flange, actually comprising annularly spaced portions of the flange. For this purpose, the flange portion 44 is recessed at uniformly spaced intervals as indicated at 47 to define the individual retaining finger extensions 41 which are thus provided with finger back or body portions 48. By having the cutouts or recesses 47 of generally arch shape the finger extension bodies or backs 48 are of flaring outline from their tips to the flange 44. That is, the finger backs are of substantially greater width at juncture with the flange 44 than the width of the fingers at their terminal portions. Furthermore, by having the recesses 47 of arcuate outline, the edges defining the cutouts are without any angular notches or other angular juncture with the body of the flange 44, but the sides of adjacent finger backs 48 merge on a continuous arc. Since the flange 44 is circular, and the finger backs 48 are formed in the plane of the flange 44, the finger backs 48 are also curved transversely on the curvature of the flange 44.

The terminal portions of the retaining fingers 41 are formed with a generally radially outwardly and somewhat axially outwardly projecting gripping extremity flange portion 49 joined integrally in one piece with its extension back body portion 48 by means of a rib-like juncture 50 which affords a substantial stiffening reinforcement between the finger back and terminal flange portions. To assure stiffness in the finger terminal flange portions 49, they are formed quite short relative to the finger backing body portions 48. Thus, it will be observed that each of the terminal gripping flange portions 49 is only a fraction as long as its finger backing body portion 48. In a practical form, the terminal flange portions 49 may be only about one-fourth as long as the length of the finger backing portions from the juncture 50 to the juncture shoulder 45 of the retaining flange structure. The finger back portions 48, on the other hand, are relatively flexible in radial direction, although by reason of the bowed transverse cross section and the connection afforded between adjacent retaining fingers 41 by the continuous flange 44 substantial resilience will be inherent in the finger backings 48.

Prior to application of the cover 30 to the wheel, the flange 44 and the finger body backs 48 are generally cylindrical as indicated in dash outline in Figure 4 and in full outline in Figure 5. In this condition, the tips of the retaining terminal flanges 49 of the retaining fingers extend to a diameter substantially greater than the inside diameter of the terminal flange 34.

In applying the cover 30 to the wheel, the cover is generally centered with respect to the wheel and with the axially inner sides of the gripping terminal portions 49 of the fingers cammingly engaging at the axially outer margin of the tire rim intermediate flange 34 at or adjacent to the shoulder 37. Axially inward pressure is then applied to the cover, which causes the retaining finger terminal portions 49 to cam inwardly along the inner, frusto-conical face of the intermediate flange 34. Thereby, the finger terminal portions 49 are forced progressively radially inwardly and since the terminal portions 49 are relatively short and stiff and are rigidly reinforced by the respective juncture ribs 50, which have not only a transverse but also cross sectional, compound reinforcing radii, the radial inward pressure does not substantially deflect or bend the retaining terminal portions 49 but is reflected in resilient inward deflection of the finger extension body portions 48, as shown in full outline in Figs. 4 and 6.

Because of their substantial resilient stiffness, radially inward deflection of the retaining fingers 41 tends to be reflected in certain resilient movement of the adjacent marginal portion of the cover, and for this reason it is highly desirable to have the cover margin substantially cold worked to afford desirable resilience therein. For example, referring to Figures 5 and 6 it will be observed by comparison of the pin projections 51, 52 and 53 in Figure 5 with the same pins in Figure 6 after the retaining finger 41 has been deflected radially inwardly as indicated by the directional arrow D, that there is a substantial amount of resilient movement effected in the cold worked, resilient marginal portions 39, 43 and 42. Such resilient deflection is a desirable tensioning feature for effective cover retaining gripping engagement of the retaining finger terminals 49 at their edges 54 with the tire rim flange. Such tensioning also assures that the corners of the retaining terminals 49 increased by notches 55 will effectively bite into the rim surface to hold the cover against turning on the wheel. Further details as to the function and advantages of this cover retaining structure will be found in my Patent 2,624,634 issued January 6, 1953 which is a continuation-in-part of the present application.

In the manufacture of the cover 30, it is desirable that from an economy standpoint the cover be made from as inexpensive material as practicable. It is also desirable that the material lend itself easily to a commercially acceptable finish. Sheet steel is a desirable material for this purpose, and more especially stainless steel, preferably chrome-nickel steel. Among the valuable characteristics of such material is its ready workability in thin gauge stock and its ready adaptability to high lustrous polish and plating. Another and very important attribute of chrome-nickel steel sheet has been found to reside in the fact that although in the sheet before working it has primarily austenitic characteristics, it is capable of developing martensitic character on cold working. The material from which the cover 30 is made should have these characteristics because it is desirable to form the cover by drawing the metal sheet to form. An austenitic steel lends itself well to die forming but does not possess sufficient hardness and resilience to afford adequate tensioning of the retaining fingers for the cover. However, where the material is capable of developing martensitic character, that is hardness which is an attribute of a tempered, resilient steel it is possible to make the entire cover from a single piece of material, including not only the drawn body portion of the cover but also the resilient spring retaining flange and finger structure.

Highly desirable results have been obtained by using sheet steel such as 16 to 18–6 to 8 chrome-nickel or stainless steel of from .019 to .021 inch thickness or gauge. Such material will have a tensile strength of from approximately 100,000 to 125,000 pounds per square inch and a yield strength of from approximately 47,000 to approximately 49,000 pounds per square inch, while the elongation of a blank specimen subjected to tests will be from approximately 53% to 58%.

A preferred method of making the cover to attain the desired form and functional characteristics on an efficient economical mass production basis comprises drawing the body portion of the cover and then drawing and cold working the marginal flange and retaining finger portion of the cover to change the austenitic material into martensitic character in the marginal portions of the cover, having the hardness and resilience requisite for the self-retaining functions of the retaining fingers. For a more detailed description of the method reference is made to my Patent 2,707,449 issued May 3, 1955, which is a continuation-in-part of the present application.

Figure 11:
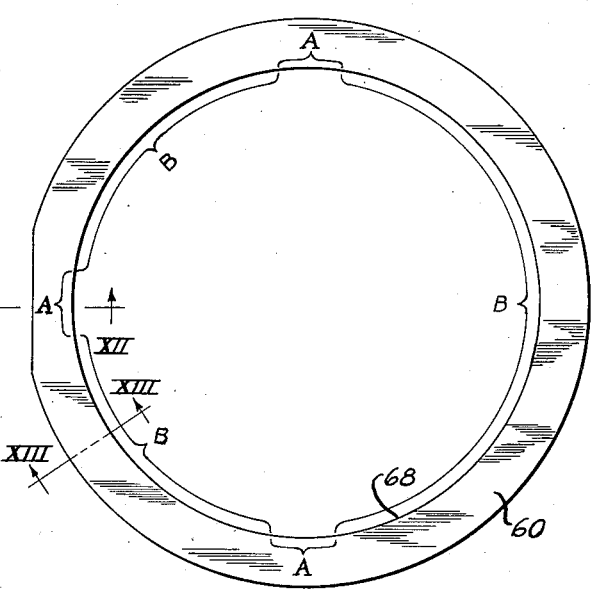
Figure 11 is a top plan view of the lower blank-margin gripping ring of the hold-down structure of the die apparatus.
Figure 13:
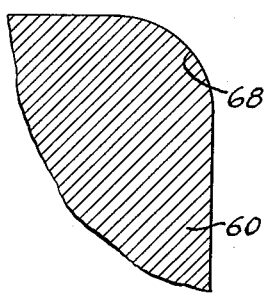
Figure 13 is a greatly enlarged fragmentary vertical sectional detail view taken substantially on the line XIII—XIII of Figure 11.

To carry out certain early steps in such method improved apparatus as illustrated in Figs. 7 through 13 of the drawings may be used.

Having reference to Figs. 7, 8, 9 and 10, a strip of the sheet metal, preferably in the form of a continuous strip that may be fed from a coil or roll of the material and identified by the reference character M is fed into a drawing die press assembly 57. This includes a lower die bed block or plate member 58 supporting for vertical reciprocal movement an upwardly spring urged central stripper and die member 59 and a vertically reciprocable normally upwardly spring urged gripper ring 60. In the initial action of the die assembly 57 a hold down ring 61 is brought to bear with gripping action upon the metal blank in the press by working against the gripper ring 60, the pressure for this purpose being applied against the hold down ring 60 by a carrying and ram head assembly 62. At the same time the blank which was formed by the immediately preceding operation of the drawing die assembly 57 is severed from the blank being newly formed by the action of a shear block 63 carried by the die bed member 58 and a shear block 64 carried by the die head member 62, as seen at the left side of Fig. 7.

As an incident to the hold-down gripping of the sheet metal blank, an annular forming ring 65 carried by the die head 62 drives a rounded cross section annular forming rib 67 against the metal blank immediately inside the hold-down gripper ring 60 and presses a groove into the blank while the margins of the blank are gripped between the hold-down rings 60 and 61, there being a slight amount of inward drawing of the metal over the inner upper edge of the ring 60, such edge being identified at 68. This forms a rounded cross section hollow annular rib R in the metal blank between the extreme margin of the blank which is held flat between the hold-down and gripper rings 60 and 64 and the body of the blank. This rib R is of great importance since it ultimately will constitute in the finished cover a part of the hardened, resilient marginal structure of the cover. Formation of the rib R by the forming die rib 67 initiates cold working of the sheet metal of the cover marginal structure and which ultimately stretches and hardens the material.

As an incident to downward hold-down movement of the hold-down ring 61, in addition to depressing the lower gripping ring 60 so as to effect shearing coaction of the shearing members 63 and 64, drawing of the body of the cover is initiated by drawing the portion of the sheet metal blank located inwardly from the rib R over a rounded cross section forming die annulus 69 which is contoured to impart to the intermediate portion of the blank drawn thereover substantially the cross sectional shape of the intermediate rib-like portion 40 of the finished cover.

Depression of the hold-down ring assembly and the rib former 65 as a unit is limited to the extent of shaping the sheet metal blank over the radially outer side of the contoured forming surface of the forming annulus 69 substantially as shown in Figs. 7 and 9. Up to this point, the rib forming annular portion 67 has been advanced in its rib forming projection into the blank to only a limited extent insufficient to cause undue binding of the material of the blank as the material draws inwardly past the forming ridge 67 in the course of shaping the blank over the radially outer side of the forming surface of the forming annulus 69. When the hold-down and rib-forming assembly comes to a halt at the limit of its downward stroke, the remainder of the body of the cover blank is drawn by circular die structure in the present instance including a forming annulus 70 and a central forming plug 71 carried by a ram 72 by which the forming annulus and plug are driven downwardly against the body of the blank. The forming annulus 70 draws the blank against the radially inner side of the forming surface of the lower forming annulus 69 and also against the radially outer margin of the forming surface of a lower forming die member 73. At the same time the central forming plug 71 draws the central portion of the blank against the remainder of the forming surface of the forming die member 73 and also against the forming surface of the former and stripper 59.

Throughout all but the last part of the drawing relative movement of the die members 70 and 71, the forming ring 65 remains stationary and therefore a limited drawing in of the margin of the blank around the contour of the forming rib 67 is permitted under the drawing pressure so as to avoid overstretching of the blank while effecting a limited amount of such stretching as a result of the drawing operation. However, in the final stage of the draw and immediately preceding driving of the body of the blank by the upper die members 70 and 71 against the lower die members 69 and 73 to complete the drawing of the inner or body portion of the blank, further drawing actuation of the drawing ring member 65 is effected so as to increase the draw of the marginal rib R. This is effected by engagement of a shoulder 74 on the ram 72 with the upper side of the forming ring member 65 which for this purpose extends radially inwardly beyond the inner periphery of the head member 65 through which the ram 72 moves reciprocably.

As the drawing ram 72 descends through the final increment of the drawing stroke, the forming ring member 65 is depressed relative to the hold-down ring 61 to thereby increase the length of the rib R, a lost motion connection between the hold-down ring 61 and the die member 65 being effected for this purpose as by means of a radially outward shoulder 75 projecting into and vertically reciprocably received within a groove 77 in the adjacent surrounding wall of the ring 61 and which groove is substantially wider than the rib or shoulder 75 so as to afford ample clearance for relative downward drawing movement of the forming ring 65 into the relative forming position shown in Figs. 8 and 10 at the completion of the drawing stroke of the ram 72. Thus, in a single drawing operation, the preceding formed blank is severed from the succeeding blank on the metal strip M, the entire body portion of the cover is drawn to shape, and the margin of the cover blank is subjected to substantial cold working and preliminary formation of the marginal rib structure.

In order to effect substantial economy of material the lower hold-down clamping ring 69 over the inner upper edge 68 of which the marginal portion of the blank is drawn functions to resist inward drawing of the narrowest portions of the margin of the blank while promoting relatively more free inward drawing of the blank margins at the wider portions. It will be appreciated that since the blank is derived from a strip having parallel sides, while the cover is drawn to a circular outline, four corner portions of every blank will provide substantially wider marginal areas about the circular outline than at the sides of the blank and at the advancing end of the strip from which the preceding formed blank is severed.

Differential inward drawing of the margin of the blank is accomplished by having the draw-over edge 68 of the hold-down clamping ring 69 formed where needed such as at diametrically opposite sides corresponding to the sides of the metal strip and at an intermediate point adjacent the shearing mechanism of a smaller radius than all of the remainder of the edge 68. Thus, having reference to Fig. 11 substantially the segmental areas identified by the brackets A are formed on a smaller edge radius than the remainder of the edge 68 identified by the brackets B. The differential in radius is shown in an exaggerated form in Figs. 12 and 13. In actual practice a desirable radius A has been found to the approximately $\frac{1}{32}$ inch while a desirable radius B has been found to be about $\frac{3}{32}$ inch. During the drawing operation, radially inward movement of the marginal portions of the blank is substantially resisted at the three limited areas A due to the small radius of the edge 68, while the larger area portions at the corners of the blank margin are more freely pulled in toward the center as the drawing operation progresses. It will be observed that the trailing portion of the blank where it is still attached to the strip of stock M has no differential draw-in resistance because at this point such differential resistance is unnecessary in continuous strip production. Of course, if a separate blank is to be processed, a fourth area of differential smaller radius may be provided on the edge 68. As a result of the differential edge radius, the square edges of the blank can be cut quite close with a substantial saving in material in mass production.

After the blank has been formed in the drawing die 57 and has been severed from the strip of material M, it is subjected to further working steps including trimming of the retaining fingers, working of the trimmed margin, forming of the fingers, and transforming of the rib R into the radially outwardly extending overlying marginal portion 39, 43, 42 of the cover as taught in my said Patent 2,707,449.

It will be understood that modifications and variations may be effected without departing from the scope of the novel concepts of the present invention.

I claim as my invention:

1. In apparatus for making a vehicle wheel cover from sheet metal, a drawing die assembly including relatively reciprocably cooperable circular drawing die members to shape the inner portion of a sheet metal blank, hold-down annuli by which the margins of the blank are gripped in advance of engagement of the blank with one of said reciprocable drawing die members, a floating ring member cooperating with said hold-down annuli and the other of said die members to shape an annular marginal rib in the blank to a preliminary shallow depth in advance of engagement of said blank by said one of said drawing die members, and means operable as an incident to the last increment of the forming stroke of said die members to drive said floating forming ring in an additional increment of rib-forming stroke to deepen said rib.

2. In apparatus for making a vehicle wheel cover from a sheet metal blank, a circular drawing die assembly including relatively reciprocably cooperable circular drawing die members for shaping the inner portion of the blank, hold-down annuli engageable with the margins of the blank in advance of engagement of the blank by one of said drawing die members, one of said annuli which is reciprocable with respect to the other of said annuli having a shoulder thereon, a floating ring member having a circular forming surface thereon and including a shoulder engageable by said annulus shoulder for movement by said reciprocable annulus to drive said circular forming surface into blank shaping engagement with respect to the other of said die members, and means operable as an incident to the final increment of the forming stroke of said one die member to drive said floating die ring member from the annulus shoulder in an additional increment of forming stroke with respect to said other of said die members.

3. In apparatus for making a circular vehicle wheel cover from a sheet metal blank, a drawing die assembly including relatively reciprocably operable circular drawing die members for shaping a circular inner portion of the metal blank, relatively reciprocable hold-down annuli about said drawing die members engageable with the margins of the blank in advance of the engagement of the blank by one of said drawing die members, a floating ring member within said annuli and reciprocable with one of said annuli to shape an annular marginal rib in the blank between the other of said hold-down annuli and the other of said drawing die members and in advance of the drawing of the inner portion of the blank by said one die member against the other of said die members, and shoulder means on said one die member engageable with said floating ring member incident to the final increment of the forming stroke of said one die member to drive the floating ring member in an additional increment of rib-shaping stroke to deepen the rib in the sheet metal blank.

4. In combination in a die forming apparatus for forming shaped wheel covers from the end of a supply length of strip metal of a width sufficient to form a single article, a female die having a circular opening with an inner upper rounded edge, clamping means positioned for engagement with the upper surface of the female die to hold the strip metal thereagainst, and a circular male die positioned to be passed into the upper open face of the female die to shape the strip metal clamped thereagainst, said rounded edge of the female die opening having two diametrically opposite lengths of a sharper radius than the lengths therebetween and having a single length of a sharper radius midway between said two lengths whereby a supply length of strip metal may be fed between the male and female dies from the side opposite said single length of sharper radius and the rounded edges of sharper radius of the female die will offer a greater resistance to the metal drawing into the female die at the sides and leading edge of the length of metal than the lengths of the die edge therebetween when the male die forces the metal into the circular opening of the female die.

5. In apparatus for shaping circular wheel covers from sheet metal, a lower die assembly having an inner circular metal shaping portion with an intermediate circular portion thereabout providing an upstanding generally rib-shaped forming member of substantial cross-sectional dimensions and generally rounded in contour and having thereabout an axially reciprocably mounted blank margin clamping portion, and an upper die structure reciprocably operable into and out of metal shaping coaction with the lower die structure including a circular radially outer portion clampingly engageable with said lower die blank-margin clamping portion to clamp the margin of a sheet metal blank and draw the material of the blank radially inwardly from the margin down over the crest and radially outer side contour of said upstanding intermediate lower die portion, said upper die structure including a central die portion operable in sequence after said upper die radially outer portion to act upon the central portion of the blank to draw the same axially toward said lower die central portion for shaping the blank between said upper and lower die central portions, said upper die structure having a circular die portion intermediate the radially outer and central portions of the upper die structure operative in the final action of the upper die structure relative to the lower die structure to draw material of the sheet metal blank axially inwardly alongside the lower die intermediate upstanding rib portion and radially inwardly theretoward from between said upper and lower die blank-margin clamping portions, means for moving said outer and intermediate die portions in proper sequence, and means for subsequently moving said central and intermediate die portions in proper sequence.

6. Apparatus as defined in claim 5, wherein said intermediate upper die portion comprises a rib-forming ring die member which is operative at the radially outer side of said lower die intermediate upstanding forming rib portion, while the central forming portion of the upper die assembly includes a forming surface portion coactive with the radially inner side of said lower die intermediate upstanding rib portion to draw material of the sheet metal blank over and onto the radially inner side of said upstanding rib.

References Cited in the file of this patent

UNITED STATES PATENTS

| Number | Name | Date |
|---|---|---|
| Re. 19,467 | Lyon | Feb. 12, 1935 |
| 368,526 | Fowler | Aug. 16, 1887 |
| 460,551 | Bodge | Oct. 6, 1891 |
| 682,257 | Hinz | Sept. 10, 1901 |
| 697,728 | Latulip | Apr. 15, 1902 |
| 857,235 | Gossweiler | June 18, 1907 |
| 970,092 | McDonald | Sept. 13, 1910 |
| 1,495,103 | Page | May 20, 1924 |
| 1,649,841 | May | Nov. 22, 1927 |
| 1,725,584 | Humphries | Aug. 20, 1929 |
| 1,765,807 | Thomas | June 24, 1930 |
| 1,858,047 | Ireland | May 10, 1932 |
| 1,884,700 | Hothersall | Oct. 25, 1932 |
| 1,884,708 | Jeneson | Oct. 25, 1932 |
| 1,904,920 | Hothersall | Apr. 18, 1933 |
| 1,960,000 | Chesney | May 22, 1934 |
| 2,014,815 | Rutledge | Sept. 17, 1935 |
| 2,064,160 | Hochreiter et al. | Dec. 15, 1936 |
| 2,075,847 | Hothersall | Apr. 6, 1937 |
| 2,193,104 | Lyon | Mar. 12, 1940 |
| 2,239,897 | Lyon | Apr. 29, 1941 |
| 2,254,376 | Lyon | Sept. 2, 1941 |
| 2,270,187 | Dulmage | Jan. 13, 1942 |
| 2,282,588 | Lyon | May 12, 1942 |
| 2,304,582 | Lyon | Dec. 8, 1942 |
| 2,377,351 | Martin | June 5, 1945 |
| 2,377,599 | Allen | June 5, 1945 |
| 2,413,591 | Sturdy | Dec. 31, 1946 |
| 2,434,375 | Van Saun | Jan. 13, 1948 |
| 2,492,886 | Punte | Dec. 27, 1949 |
| 2,545,570 | Caldwell | Mar. 20, 1951 |
| 2,689,539 | Lyon | Sept. 21, 1954 |

FOREIGN PATENTS

| Number | Country | Date |
|---|---|---|
| 121,532 | Sweden | Apr. 27, 1948 |